(12) United States Patent
Durst et al.

(10) Patent No.: US 6,518,919 B1
(45) Date of Patent: Feb. 11, 2003

(54) MOBILE OBJECT LOCATOR

(75) Inventors: Jennifer Durst, 10 Hunt Ct., Jericho, NY (US) 11753; Eugene F. Fowler, Richardson, TX (US); Joseph C. McAlexander, Murphy, TX (US)

(73) Assignee: Jennifer Durst, Jericho, NY (US)

( * ) Notice: Subject to any disclaimer, the term of this patent is extended or adjusted under 35 U.S.C. 154(b) by 0 days.

(21) Appl. No.: 09/862,569

(22) Filed: May 22, 2001

Related U.S. Application Data

(63) Continuation of application No. 09/362,789, filed on Jul. 28, 1999, now Pat. No. 6,236,358.
(60) Provisional application No. 60/140,040, filed on Jun. 18, 1999.

(51) Int. Cl.[7] .............................. G01S 5/02; H04B 7/185
(52) U.S. Cl. ............................. 342/357.07; 342/357.06; 342/357.09
(58) Field of Search ....................... 342/357.01, 357.06, 342/357.07, 357.09; 701/213, 215

(56) References Cited

U.S. PATENT DOCUMENTS

| | | | |
|---|---|---|---|
| 5,207,179 A | | 5/1993 | Arthur et al. |
| 5,223,844 A | * | 6/1993 | Mansell et al. .............. 342/357 |
| 5,650,770 A | | 7/1997 | Schlager et al. |
| 5,857,433 A | * | 1/1999 | Files ........................... 119/720 |
| 5,963,130 A | | 10/1999 | Schlager et al. |
| 6,067,018 A | * | 5/2000 | Skelton et al. ........... 340/573.3 |
| 6,259,399 B1 | * | 7/2001 | Krasner .................. 342/357.06 |
| 6,271,757 B1 | | 8/2001 | Touchton et al. |
| 6,297,768 B1 | | 10/2001 | Allen, Jr. |

* cited by examiner

*Primary Examiner*—Dao Phan

(57) ABSTRACT

There is disclosed a method and apparatus for an object locator system (10) for requesting and obtaining information about the location of a mobile object, having attached thereon a lightweight object locator (42), operable in a region served by a two-way paging system (12) and a global positioning satellite system (50). The object locator (42) may be selectively activated to conserve power or enabled to respond only when beyond or within a boundary. Further, the object locator system (10) may provide the location information in several forms including rectangular or polar coordinates referred to a base station (18) or origin, position on a map display, etc. In alternate embodiments the two-way paging system (12) may be substituted by a direct wireless link or a satellite relay communications link; the location information may be translated into human readable form either before or after transmission from the object locator, the location information may be presented at an output as selectable text, spoken message or graphic display including a map, the location information may have associated therewith other information such as time the location was determined, the status of the object locator, the condition of the battery, position of the object locator relative to a boundary or electronic fence or to indicate an alarm condition; or the location information may be accessed or delivered by dial-up or automatic means.

46 Claims, 8 Drawing Sheets

MOBILE OBJECT LOCATOR

CROSS REFERENCES TO RELATED APPLICATIONS

The present application is a Continuation U.S. patent application Ser. No. 09/362,789, filed Jul. 28, 1999, now U.S. Pat. No. 6,236,358, and entitled MOBILE OBJECT LOCATOR, which is a Continuation-In-Part and claims priority in U.S. Provisional Patent Application Ser. No. 60/140,040, filed Jun. 18, 1999 and entitled PET LOCATOR.

TECHNICAL FIELD OF THE INVENTION

The present disclosure pertains generally to electronic personal locating devices for determining the location or position of a mobile object or animal, and more particularly, a device for determining the location or position of a mobile object or animal by utilizing the capabilities of two-way paging systems or other wireless communication means and global positioning satellite systems.

BACKGROUND OF THE INVENTION

Tracking the location of an individual or an object or even an animal such as a domesticated animal or a pet that can move in unknown directions over a considerable range of territory has been a concern for a number of years. A number of systems have been proposed which employ existing wireless communication capabilities but which tend to be cumbersome, bulky, expensive or all of the above. With the advent of global positioning satellite system (GPS) services, it has been possible to provide relatively inexpensive location systems for determining the location of a moving object. These have typically been utilized on trucks to provide location information for companies that have large fleets of trucks in use at any one particular time. The position of an individual truck is determined by the coincident reception of signals from at least three of the GPS satellites by a satellite receiver, which position can then be stored or can be transmitted to a central receiving station via some sort of wireless link. Moreover, the wireless link can be a two-way communication link wherein the positioning information is only transmitted in response to receiving a request. However, the global positioning system (GPS) has some disadvantages in that it is relatively slow in acquiring the location data and it is strongly dependent upon the target object being in an open area where it is in a line of sight position relative to at least three GPS satellites. A further disadvantage, particularly in a small, portable unit, is that the GPS receiver that must be included in a locating device requires the use of substantial electrical energy during the period in which the location information is being acquired and developed from the GPS system. Further, a small portable object locator, in addition to minimizing the use of electrical power while being subject to less than ideal orientations to enable quick and efficient location by the GPS system, must also be very simple and easy to use.

SUMMARY OF THE INVENTION

The object locator described in the present disclosure and claimed herein comprises the steps of attaching a mobile communications unit having at least one antenna coupled thereto to the mobile object, accessing transmissions of a GPS system from the mobile communications unit to obtain location coordinates of the mobile communications unit; communicating the location coordinates from the mobile communication unit via a paging network to a base station; and outputting the location coordinates in human readable form.

In one aspect of the present disclosure a mobile object locator is mounted on a collar along with at least one antenna for receiving GPS signals and communicating with a base station. The collar is placed around the body or neck of the animal or object to be tracked or located.

In another aspect of the present disclosure a GPS receiver in the mobile object locator is activated and the GPS location coordinate data processed to determined the location of the mobile object locator wearing the mobile object locator.

In another aspect of the present disclosure the mobile object locator communicates with a base station via a paging network to process a request for location information and the return transmission containing the location information in answer to the request.

In another aspect of the present disclosure the coordinate data obtained from the GPS system may be translated to human readable form in the base station or paging network following transmission from the mobile object locator.

In another aspect of the present disclosure the coordinate data obtained from the GPS system is translated in the mobile object locator prior to transmission to the paging network or base station from the mobile object locator.

In another aspect of the present disclosure the mobile object locator communicates with the base station via any suitable direct or satellite wireless link whereby translation of the coordinate data obtained from the GPS system may be performed before or after its transmission to the base station.

In yet another aspect of the present disclosure, the output of the location information may be provided in text, spoken or graphic forms, via a loudspeaker or a display as may be selectable by the user.

In another aspect of the present disclosure, the object locator system may plot the location information on a map or permit the user to manually plot the location information or identify the location of the mobile object locator from the location information message.

In another aspect of the present disclosure, the output of the location information may be forwarded from the base station or paging network or other intermediate station to another remote station.

In yet another aspect of the present disclosure, other information may be associated with and transmitted with or in conjunction with the output of a location information including the time the location data was acquired, the status of the mobile object locator, the condition of the battery in the mobile object locator, whether the mobile object locator is within a pre-determined range or has passed a boundary or electronic fence, or the annunciation of an alarm condition.

In another aspect of the present disclosure, the mobile object locator system may automatically determine the location information, transmit it to the base station or dial up a user location to report the location information.

And in yet another aspect of the present disclosure, the mobile object locator may transmit the location information to a monitoring service and either store the location information for later retrieval or report the location information on receipt to the user.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
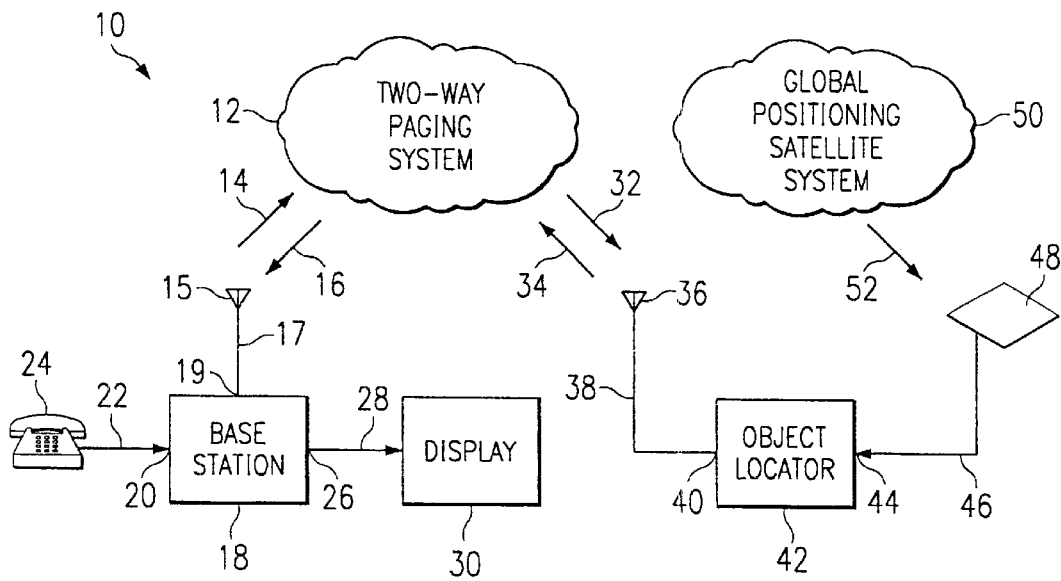
FIG. 1 illustrates a block diagram of an object locator system of the present disclosure.

Referring now to FIG. 1, there is illustrated a system block diagram of the object locator of the present disclosure. In FIG. 1, the object locator system 10 includes a two-way paging system 12, a global positioning satellite system 50 and the object locator 42. The two-way paging system 12 is a conventional paging system that is well known in the art, for example, such as illustrated and described in U.S. Pat. No. 5,423,056 issued Jun. 6, 1995 to Lindquist, et al. and entitled ADAPTIVE CELLULAR PAGING SYSTEM, which patent is incorporated by reference herein in its entirety. The two-way paging system 12 interacts with a base station 18 over a transmit path 14 and a receive path 16. The base station 18 may include a telephone, pager, and the like or may have an input 20 for receiving a dialed-in telephone number from telephone set 24 along communications path 22 or from wireless telephone set 25 over communications path 31. Base station 18 may, in other embodiments, be a paging service center in the two-way paging system 12 or a monitoring service coupled with the two-way paging system 12, instead of a separate operational point of entry for the user to interact with the object locator system 10 of the present disclosure. In general, the input 20 is responsive to dual tone multi-frequency (DTMF) tones transmitted by telephone set 24 or wireless telephone set 25. Base station 18 further has an output 26 from which location data to be displayed travels along path 28 to display 30. Display 30 may be configured to display location information in any of several forms, for example, text, figures, graphics, or numbers. In an alternative embodiment, the two-way paging system 12 may be substituted with a direct RF link or other wireless communication channel. The two-way paging system 12 is shown in the illustrative embodiment of the present disclosure to represent functionally the concepts of the present disclosure.

Continuing with FIG. 1, the object locator system 10 of the present disclosure includes an object locator 42. In one of its operational modes, as a two-way paging transceiver, object locator 42 includes an input 40 coupled to an antenna 36 along cable 38 for receiving signals transmitted by two-way paging system 12 along path 32 and for transmitting paging signals to the two-way paging system 12 along path 34. The object locator 42 also includes an input 44 for receiving from a global positioning satellite (GPS) system 50 location information signals along path 52 to be intercepted by antenna 48 and conducted to the object locator 42 along path 46 to input 44. The global positioning satellite system 50 is of a conventional design well known in the art, an example of which is described in U.S. Pat. No. 5,726,660 issued Mar. 10, 1998 to Purdy, et al. and entitled PERSONAL DATA COLLECTION AND RECORDING SYSTEM, which patent is hereby incorporated by reference herein in its entirety. Alternatively, location information signals may be received from the GLONASS satellite system by the use of a receiving system configured for such reception.

In operation, object locator 42 is intended to be carried or attached to an individual, an object or an animal to be located or tracked by the object locator system of the present disclosure. A user enters the system from the base station 18 by dialing the telephone number address corresponding to the object locator 42, which functions as a paging transceiver, for example, on telephone set 24. The telephone number address may also be dialed from wireless telephone set 25 and transmitted via RF channel 31. The DTMF signal then travels along path 22 to input 20 of base station 18 where it is converted to a paging transmit signal and transmitted from antenna 15 along transmit path 14 to the two-way paging system 12. The two-way paging system 12 relays the paging message via transmit path 32 to the antenna 36 coupled to the object locator 42. As will be described in more detail hereinbelow, the object locator 42 processes the request for location information transmitted by base station 18, obtains location information from the global positioning satellite system 50 and transmits a response containing the location information from antenna 36 along path 34 to the two-way paging system 12 which, in turn, relays the location information signal along path 16 to antenna 15 of the base station 18 for processing and display on display 30. This relay of the location information may occur automatically or in response to a specific inquiry. Alternatively, wireless paths 14 and 16 along with antenna 15 may instead each comprise a standard telephone connection to a central office. Thus, a paging center may dial the phone number of the base station to deliver the location information.

Figure 2:
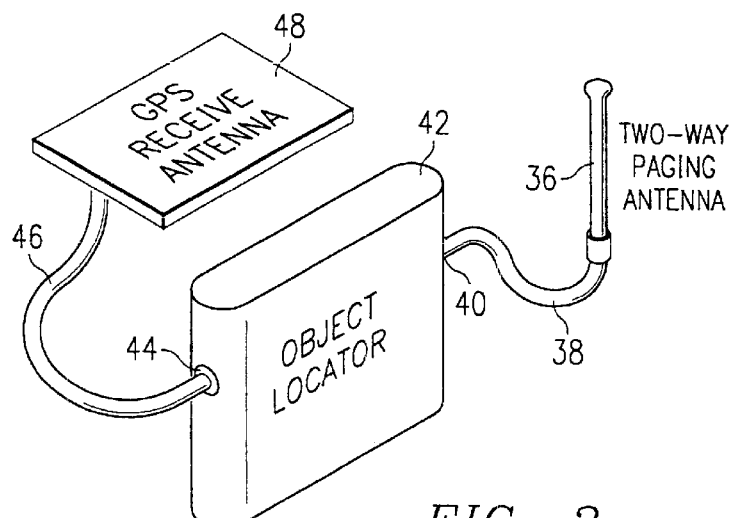
FIG. 2 illustrates a pictorial example of an object locator according to the present disclosure.

Referring now to FIG. 2, there is illustrated a pictorial drawing of an object locator 42 as it may be typically configured with a two-way paging antenna 36 and a GPS receive antenna 48. The two-way paging antenna 36 is coupled to object locator 42 along cable 38 to an input 40 on the object locator 42. Similarly, the GPS receive antenna 48 is coupled along a cable 46 to an input 44 on the object locator 42. The two-way paging antenna 36 shown in FIG. 2 is intended to represent the fact that this antenna in the object locator 42 is typically of the type found with two-way paging equipment. Such an antenna is typically mounted internal to the pager unit itself and is thereby necessarily of very small dimension. However, there may be applications of the object locator 42 of the present disclosure which may be optimized by the use of an external antenna such as shown in FIG. 2. Thus, the illustration of the two-way paging antenna 36 in FIG. 2 is not intended to be limiting, but merely illustrative. The GPS receive antenna 48 is conventionally referred to as a "patch antenna" because of its flat, thin, rectangular shaped design. Typically such a patch antenna is intended to be disposed on an upward, relatively level surface in order to expose it to receive the relatively weak signals transmitted by the global positioning satellite system from the satellites arrayed in the GPS system. The illustration in FIG. 2 thus demonstrates that both of the antennae used in the system may be positioned for optimal reception and transmission and connected to the object locator 42 using the flexible cables 38 and 46 respectively for the two-way paging antennae 36 and the GPS receive antenna 48.

Figure 3A:
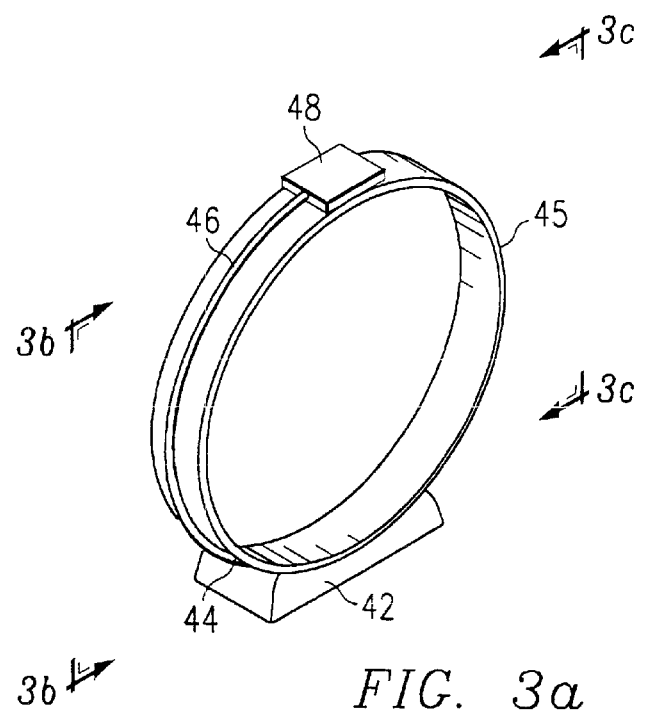
FIGS. 3a–3c illustrate a pictorial drawing of an object locator supported by a collar according to the present disclosure.
Figures 3B, 3C:
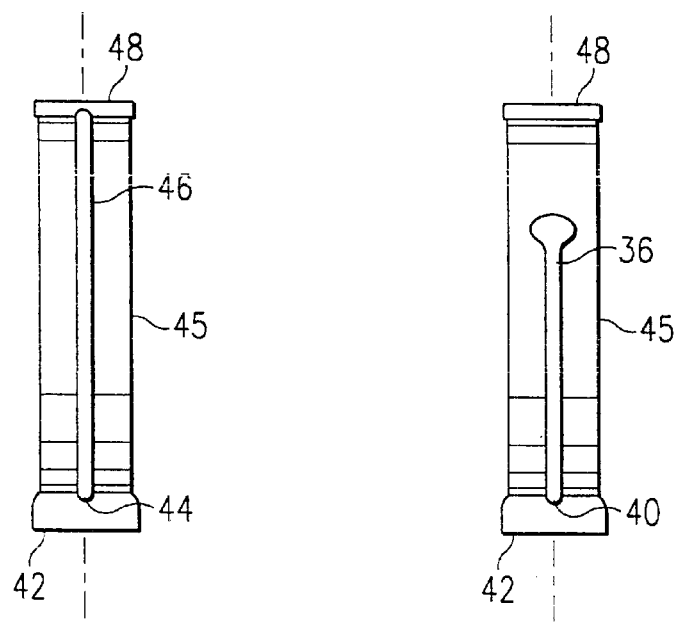

Referring now to FIGS. 3a, 3b and 3c, there is illustrated a pictorial drawing of an object locator 42 mounted on the lower side of a collar 45. Such a collar 45 is configured for supporting an object locator 42 around the body or neck of an animal which is intended to be tracked or located by the object locator 10 of the present disclosure. It will be observed that the GPS antenna 48 is attached to the collar diametrically opposite the position of the object locator. This is intentional as will be described hereinbelow. The object locator is coupled to the GPS antenna 48 through a cable 46 which connects to the input 44 of the object locator 42. This arrangement is illustrated in FIG. 3a and may be more clearly shown by looking at the cross section A–A' illustrated in FIG. 3b. In Section A–A', a side view of the object locator mounted on a collar is shown wherein collar 45 supports the object locator 42 at its lower point and supports the GPS antenna 48 at its diametrically opposite upper point. As before, the GPS antenna 48 is coupled through cable 46 to input 44 of the object locator 42. Similarly, a side view identified by cross section B–B' in FIG. 3c shows the opposite side of the collar-mounted object locator 42 assembly. In Section B–B' there is shown the collar 45 which supports the object locator 42 at its lower end and the patch antenna or GPS antenna 48 at its diametrically opposite upper end. Also shown in the Section B–B' is a representation of the two-way paging antenna 36 which is coupled to input 40 of the object locator 42. It will be appreciated that many configurations are possible for arranging or attaching the object locator and its antennae to the collar 45, including consolidating the locator and antenna as a unit locatably mounted on or in the collar or, alternatively wherein the locator and antenna is distributively arranged on or in the collar. However, it will also be appreciated that the greater mass of the object locator 42 relative to the mass of the GPS antenna 48 and the fact that they are mounted on diametrically opposite sides of the collar 45 enables the object locator 42 to always remain in the lowest possible position and the GPS receiving antenna to always remain in the highest possible position to optimize the reception from the GPS satellite system 50. Not shown in FIGS. 3a–3c is the mechanism such as a clasp or buckle arrangement whereby the collar 45 may be opened and closed to secure the collar around the neck or body of the animal to be tracked or located. Again, many configurations are possible and will be apparent to those skilled in the art.

Figure 4:
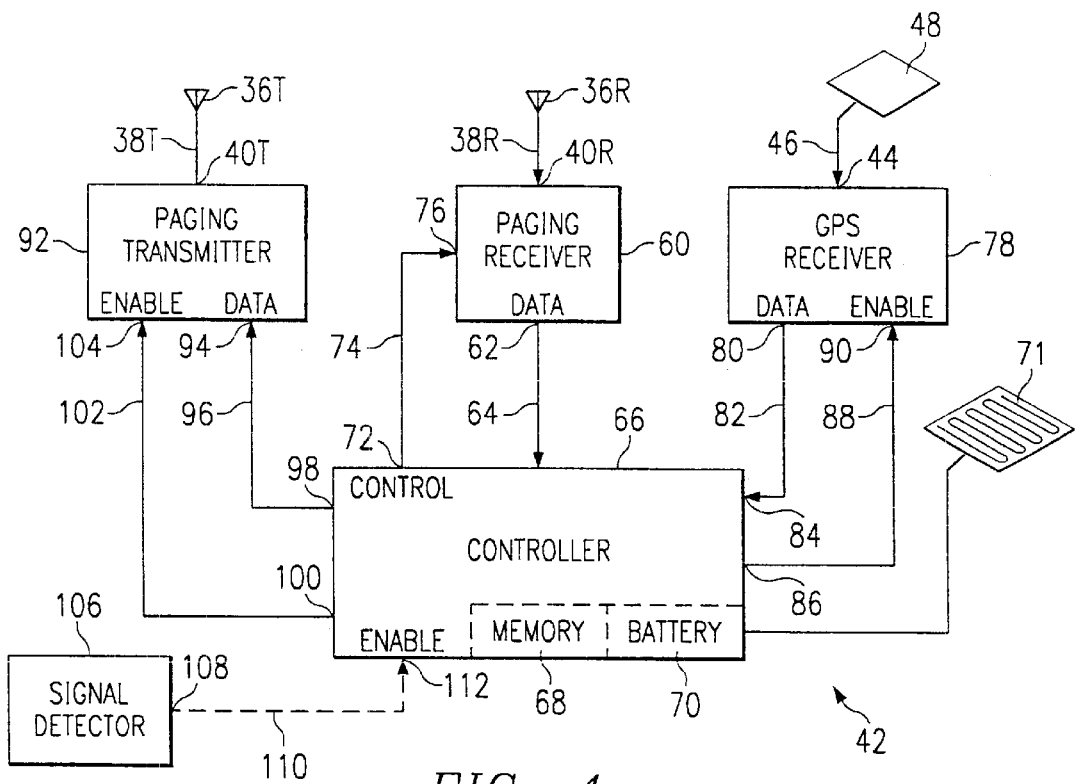
FIG. 4 illustrates a block diagram of the object locator of the present disclosure.

Referring now to FIG. 4, there is illustrated a block diagram for the object locator 42 of the object locator system 10 of the present disclosure. A paging receiver 60 is shown coupling a data output 62 along path 64 to an input of controller 66. Controller 66 includes a memory 68 for the storage of location data and a battery 70 for powering the object locator 42. This battery 70 is, in the present disclosure, a rechargeable battery. This battery 70 can be a NiCad battery or a Lithium battery. A solar cell 71 is provided for charging the battery 70. Controller 66 includes a control output 72 which is coupled along path 74 to a control input 76 of paging receiver 60. Paging receiver 60 receives paging communications via antenna 36R which are coupled along cable 38R to RF input 40R of paging receiver 60.

Continuing with FIG. 4, there is shown a GPS receiver 78 for which provision is made to couple location data at an output 80 along path 82 to an input terminal 84 of controller 66. GPS receiver 78 further includes an enable input which is coupled from controller 66 at output 86 along path 88 to the enable input 90 of the GPS receiver 78. The GPS receiver 78 receives GPS signals from the global positioning satellite system 50 at antenna 48 which signals are coupled along path 46 to RF input 44 of the GPS receiver 78. In an alternative embodiment GPS receiver 78 may be configured for the reception of differential GPS signals to enhance the accuracy of determining the location coordinates.

Further illustrated in FIG. 4 is a paging transmitter 92 which is configured to transmit the location data provided by controller 66 at output 98 along path 96 to the data input 94 of paging transmitter 92. Controller 66 also provides an enable output at output along path 102 to the enable input 104 of paging transmitter 92. The paging transmitter 92, when enabled, transmits data received at the data input 94 and couples the signal to be transmitted from the output terminal 40T along path 38T to the paging transmitter antenna 36T for radiation to the two-way paging system 12. It will be appreciated that the paging system components, while shown as separate functional elements in FIG. 4, may in fact be integrated into a single two-way paging transceiver which share a common antenna represented by reference number 36. The illustration shown in FIG. 4 is intended to provide clarity as to the signal paths that operate during the communication relationship of the object locator 42 with the two-way paging system 12. A number of configurations for coupling the antenna to the paging transceiver are feasible and are also well known in the art and will not be described further herein.

Continuing with FIG. 4, there is shown a block labeled "signal detector" 106 having an output 108 which is coupled along path 110 to an enable input 112 of controller 66. The signal detector 106 represents any of several optional devices which may enable the more precise control of the object locator 42 by limiting the operation of the object locator 42 to certain external conditions outside the paging communications or the GPS reception areas by the object locator 42. In the illustrative example shown in FIG. 4, the signal detector 106 provides an output whenever its detection threshold is crossed by signal energy picked up by antenna 105 from an independent source. In an alternative embodiment a signal detector 106 may be used to measure the RF signal energy, i.e., the signal field strength noise or the signal-to-voice ratio, for example, that is present at antenna 36R shown in FIG. 4. Such threshold, for example, may represent a limiting point beyond which the object locator is enabled to operate e.g., by an electronic fence or, the threshold may represent a distance within which a position of the object locator will probably provide no useful information since the object locator 42 may be within line of sight to the base station, for example. Or, the threshold may be expressed in terms of time or altitude or as an azimuth heading. Alternatively, the object locator 42 may be programmed for operating an alarm when the object locator 42 moves outside a perimeter. Such perimeter may be programmed by physically positioning the object locator 42 at extremes of an area and, while the GPS receiver 78 is operating, storing in the object locator's memory the coordinates reported, thus establishing a boundary outside of which the object locator 42 will automatically report a position. Additionally, the perimeter may be defined by at least one coordinate stored in the object locator memory. The perimeter is then determined by selecting stored algorithms to define the limits of a circular or other geometrical shape outside of which the object locator 42 will automatically report a position.

Continuing with FIG. 4, it will be appreciated that each of the major functional blocks shown in FIG. 4 may be implemented by means of integrated circuitry which may be configured to fit within a housing of very small dimensions. For example, a pocket pager that typically occupies a volume of approximately three to five cubic inches may weigh approximately four to six ounces. The controller 66 may comprise a single chip microprocessor or microcontroller or digital signal processor which may be programmed to provide a variety of functions and operational features. Such programs may be stored in memory 68 for use by the controller 66 in controlling the operation of the object locator 42. The paging receiver 60, the paging transmitter 92 and the GPS receiver 78, while shown as functional blocks, in reality, each may have a number of complex functions incorporated therein. Thus, many configurations and functional operations are possible within the scope of the block diagram illustrated in FIG. 4. For example, the GPS receiver 78 in the object locator 42 may be enabled or activated at periodic intervals by a timer (not shown) in the controller 66. Such periodic activation is useful when operating the object locator 42 as a tracking device or for automatically acquiring and transmitting location information to the paging system 12 or to the base station 18. In another embodiment, the GPS receiver 78 may be enabled or activated by command from the two-way paging system 12 or from a monitoring service which functions as a base station for a plurality of customers making use of object location services. Such paging system or monitoring service may communicate the location information to a user or a base station by wireless or wired channel means. The detailed description which follows will illustratively provide descriptions of some of the basic operational features of the object locator system 10 of the present disclosure. One such feature represented by the signal detector block 106 will be described hereinbelow in conjunction with FIG. 7.

Figure 5:
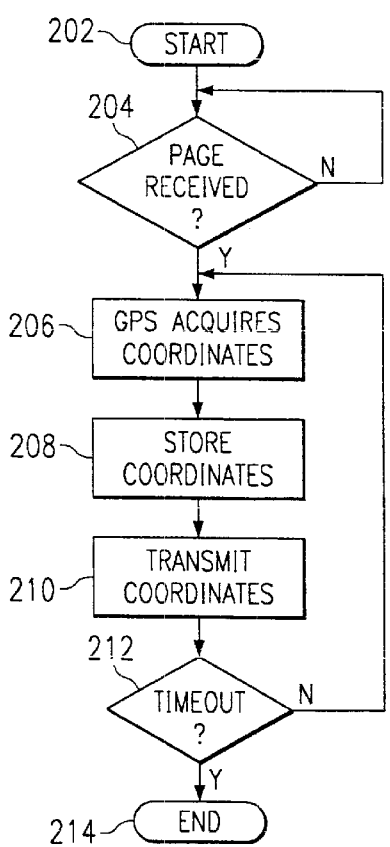
FIG. 5 illustrates a flowchart of the operation of the object locator generally.

Referring now to FIG. 5, there is illustrated a flowchart for the operation of the object locator 42 shown in FIG. 4 in the case where the user desires to determine the location of the object locator 42. This circumstance may represent any number of user activities including an owner's efforts to determine the location of a pet dog or a pet cat, for example. Similarly, the operation illustrated in FIG. 5 may also include a situation where an owner desires to track versus time, an object to which the object locator 42 is attached.

Further, the flowchart of FIG. 5 may also illustrate the situation when the object locator 42 is attached to a person and it is desired to know the location of that person at some particular time or some other previous time as further described below. The flow begins at block 202 with the start of the sequence of operations, which is followed by decision block 204 in which the object locator 42 seeks to determine whether a page requesting location information has been received by the input 40 of the two-way paging receiver 60. If the result of this determination is in the negative, then the flow returns to the input of the decision block for a retry. If, however, the result of the query was affirmative, then the flow proceeds to block 206 in which the GPS receiver 78 is enabled to acquire the location coordinates of the object locator 42 by recurring signals from the global positioning satellite system 50 illustrated in FIG. 1.

Upon successfully acquiring the coordinates of the object locator 42 and thus of the individual object or animal to which the object locator 42 is attached, the object locator 42 then operates to store the coordinate information in block 208 by loading the coordinate information into the memory 68 of the controller 66 in the object locator 42. Such coordinate information may be associated with a time stamp. Such time stamp, derived from the GPS satellite system, may then be stored in block 208 for later retrieval. Additionally, such coordinate information may further be associated with other data for communication to a base station such as object locator operational status, strength of transmitted signals, traversal of a threshold, battery condition, alarm signals and the like. The flow then proceeds from block 208, where the coordinates were stored in the memory 68, to block 210, wherein the object locator 42 is configured to transmit the coordinates in response to the request received over the two-way paging system 12. The transmission of coordinates will occur in the opposite direction utilizing the same two-way paging system 12 over which the request for location coordinates was received in block 204. Following the transmission of the coordinates in block 210, the flow proceeds to a timer block 212 which provides a measured interval of time during which the object locator 42 attempts to acquire the coordinates at the particular time from the GPS system 50. It is well known that a typical GPS system often takes a substantial amount of time to acquire location coordinate information from a sufficient number of satellites in order to fix the location of the object locator 42 with a sufficient degree of precision. The time required involves receiving several signals under conditions which may vary widely from instant to instant, which impairs the ability of the GPS receiver 78 as shown in FIG. 4 to obtain complete location data to respond to the request received by the paging receiver 60 in the object locator 42. The time value represented by the timer operating in block 212 may be on the order of five to ten minutes, for example. In block 212, if the timer has not reached the time-out value, then the flow returns to the input of block 206 where the object locator 42 again attempts to acquire the coordinates from the GPS system 50. Returning to block 212, if the timer has reached its end value, then the flow proceeds from block 212 to block 214 where the routine ends. This timed step operates to maximize the opportunity to obtain and acquire location information as well as to limit the use of power by the GPS receiver 78. FIG. 5 thus illustrates a basic mode of operation of the object locator 42. It will be appreciated that many variations on this basic operating mode are possible and may be used to enhance the operation of the object locator 42. Such features may be programmed into the controller 66 of the object locator 42.

Figure 6:
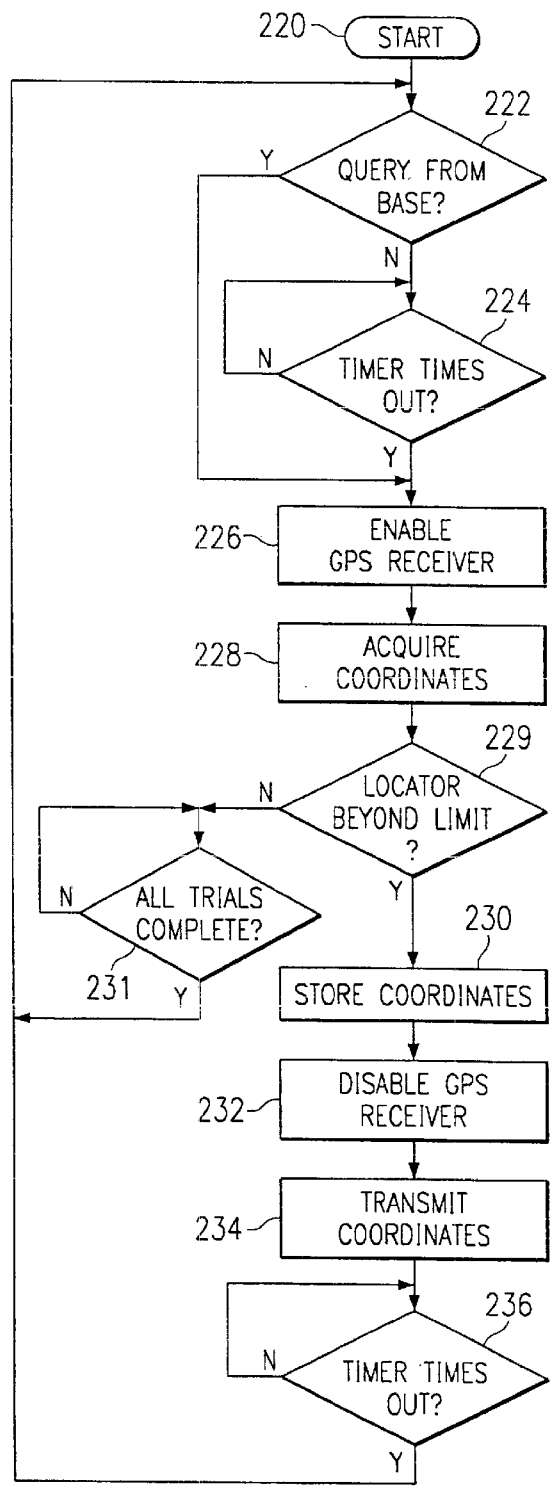
FIG. 6 illustrates a flowchart of the operation of the object locator subject to an additional external control.

Referring now to FIG. 6, there is illustrated a flowchart for the operation of the object locator 42 in the circumstance where it is activated to obtain location information from the GPS receiver 78 only, in this illustrative example, when the object locator 42 is in a position beyond a distance limit relative to the base station or some other defined location from which the request for location coordinates was initiated. The flowchart in FIG. 6 also shows additional steps in the operational sequence which may be used to enable and disable the GPS receiver 78 within the object locator 42. As was pointed out previously, the GPS receiver 78 is typically a device which requires substantial electrical power to operate and so it is to the advantage of the object locator system 10 of the present disclosure to attempt to minimize the power drawn from the object locator battery 70 in FIG. 4. This may be accomplished by limiting the operating cycle of the GPS receiver 78 to become operational only long enough to obtain the coordinate information that is required by the object locator 42.

The flow begins in FIG. 6 with a start block 220 from which the flow proceeds to a block 222, wherein the object locator 42 determines whether the object locator 42 is beyond a predetermined limit such as a minimum distance from the base station or other defined location making the request for location information. If the determination is in the negative, that is, the object locator 42 is not beyond the predetermined limit, then the flow returns to the input of the decision block 222 for another attempt. This looping will continue as long as the object locator 42 is within the predetermined limit established by circuitry within the object locator 42 and other portions of the object locator system 10 of the present disclosure. The functional operation of an illustrative example of such a predetermined limit feature will be described further hereinbelow in conjunction with FIG. 7.

Returning now to the flowchart of FIG. 6, the flow proceeds from start block 220 to a decision block 222 to determine whether the object locator 42 has received a query from the base station 18. If a query has not been received, the flow proceeds along the "N" path to a timer block 224 wherein the object locator 42 may operate a timed sequence to periodically enable the GPS receiver 78 to acquire location coordinates whether or not a query is received from the base station 18. When the timer of block 224 times out, the flow proceeds along the "Y" path to a block 226 to enable the GPS receiver 78. Returning to decision block, 222, if the object locator 42 did receive a query from the base station 18, the flow proceeds along the "Y" path to block 226 to enable the GPS receiver 78.

Continuing with FIG. 6, the flow in the object locator 42 proceeds from block 226 to block 228 to acquire the coordinates of the location of the object locator 42. Thereafter, the flow proceeds to decision block 229 to determine whether the object locator 42 is beyond a predetermined limit with respect to the base station 18. If the result of the determination in block 229 is negative, the flow proceeds along the "N" path to decision block 231 wherein a counter provides for a predetermined number of trials to establish whether the object locator 42 is beyond the predetermined limit required in block 229. If the counter in decision block 321 has not completed the last count, i.e., has not completed all attempts or trials to determine whether the object locator 42 is beyond a limit, the flow proceeds along the "N" path to re-enter block 228 to acquire location coordinates. When the counter in block 231 completes the last count, the flow proceeds along the "Y" path to the input of the decision block 222. Returning now to decision block 229, if it is determined that the object locator 42 is beyond the predetermined limit, the flow proceeds along the "Y" path to block 230 to store the location coordinates acquired from the GPS satellite during the step performed in block 228, wherein the enable signal applied to the enable terminal 90 thus operates to awaken the GPS receiver 78 so that it may communicate with the GPS system and obtain location information coordinates for the object locator 42. Thus, the flow proceeds from block 226 where the GPS receiver 78 is enabled to a block 228 where the object locator 42 acquires the coordinate information from the global positioning satellite system 50.

Continuing with FIG. 6, upon acquiring the coordinates of the object locator 42 from the GPS receiver 78, the controller 66 within the object locator 42 causes the location information to be stored in the memory 68 of the object locator 42 in the operational block 230 of FIG. 6. The flow then proceeds to a block 232 where the controller 66 operates to disable the GPS receiver 78 such that it will no longer continue to drain power from the battery, until the next time that it is desired to acquire coordinate information from the GPS system 50. Following the disabling of the GPS receiver 78 in block 232, the flow proceeds to a block 234 wherein the object locator 42 provides the location data on output terminal 98 along path 96 to the data input 94 of the paging transmitter 92. The location information is then transmitted via the two-way paging system 12 to the base station 18 shown in FIG. 1. The flow proceeds from block 234 following the transmission of the coordinate information to a time-out block 236 where a timer provides an interval of time in which the object locator 42 is permitted to acquire the coordinate information from the GPS system, thus maximizing the opportunity to acquire the coordinates before the object locator 42 becomes inactive. Here the time-out value may again typically be on the order of five to ten minutes, although the time duration may legitimately be any value that corresponds with the particular circumstances of use and, in fact, may be adjustable in some applications. In the event that the time-out value has not been reached in block 236, the operation loops back around to the input of the time-out block 236 and enables the object locator 42 to continue attempting to acquire the location information from the GPS system. In the event that the time-out value has been reached, then the flow proceeds along the "Y" path from block 236 back to the start of the sequence at the input to the decision block 222 where the object locator 42 is enabled to check whether the object locator 42 is positioned beyond the predetermined limit as previously explained.

Figure 7:
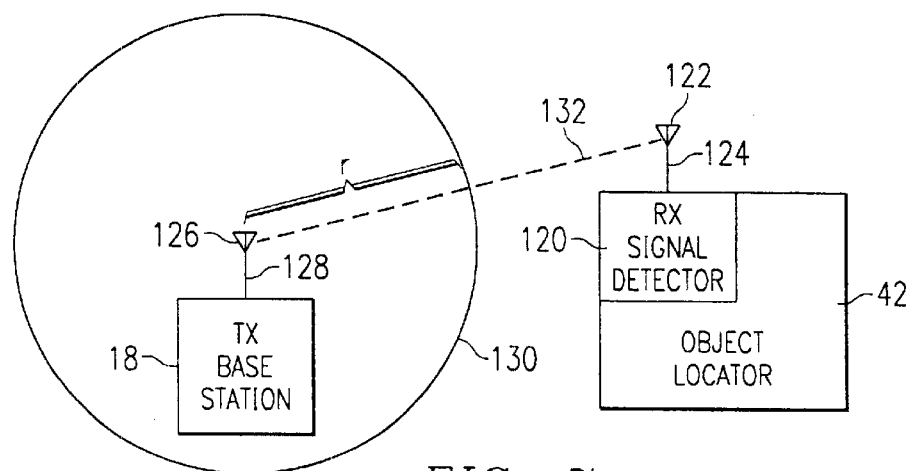
FIG. 7 illustrates a pictorial drawing of a range dependent enablement system used to provide external control for the object locator.

Referring now to FIG. 7, there is illustrated a pictorial block diagram of one configuration that is possible to provide the predetermined limit signal to the object locator 42. Shown in FIG. 7 is a base station 18 coupled with its antenna 126 through a cable 128 and operating to produce a signal which is radiated according to the radiation pattern characteristic of the antenna 126 of the base station. Also shown in FIG. 7 is an object locator 42 which includes a signal detector block 120 coupled to an antenna 122 through a cable 124. It will be noted that the base station 18 is operating in a transmit mode and the object locator 42 is operating in a receive mode via antenna 122. The object locator 42, by comparing the received signal strength of the signal transmitted by the base station from antenna 126 with a reference signal stored within the signal detector 120, is able to make a determination as to where it is in relation to the base station in terms of the distance that separates the object locator 42 and the base station 18. It is presumed in this example that the signal strength measured between the base station 18 and the object locator 42 falls off in a predictable manner as compared with the distance that separates the object locator 42 from the base station 18. An alternative to comparing the limit signal with a reference value is to simply utilize the signal-to-noise characteristics of the receiver in the object locator 42. When it is no longer possible to acquire or capture the signal from the base station 18, a limit is thereby provided. The limit may be adjusted simply by adjusting the base station signal strength. By way of illustration, a predetermined limit may thus be established by controlling the signal strength of the base station 18 signal such that at an imaginary boundary 130 surrounding base station 18 is defined. The signal strength is of a sufficiently low value which can just be detected by the signal detector 120 in the object locator 42 at the imaginary boundary 130. Thus, if the object locator 42 antenna 122 is greater than a distance indicated by the radius "r" from the base station 18, then no signal will be detected (or it will be below an acceptable threshold) and the object locator 42 is presumed to be beyond the predetermined limit represented by the distance "r", which may be thought of as an acceptance radius. If, however, the object locator 42 receives or detects the signal emitted by the base station 18 (or it is above the predetermined threshold), then it is presumed that the antenna 122 of the object locator 42 is within the radius "r" and the object locator 42 must not be, at that point, activated to attempt to acquire location information from the GPS system 50.

Figure 8:
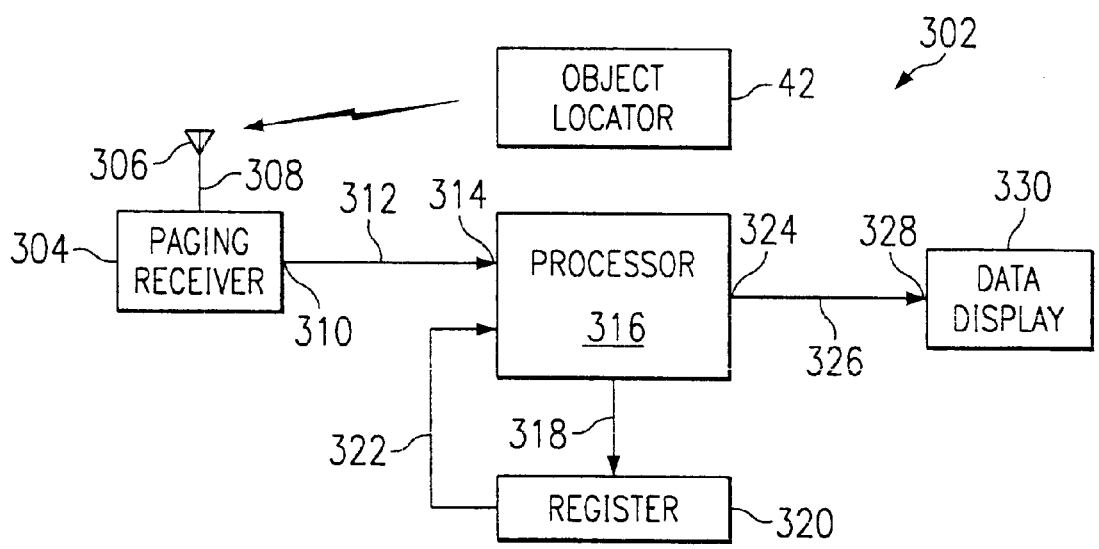
FIG. 8 illustrates a block diagram of a base station that may be used with the object locator of the present disclosure.

Referring now to FIG. 8, there is illustrated a block diagram including features which may be implemented in the base station 18 to process the location information received from the object locator 42. In the one embodiment shown in FIG. 8, the base station 302 includes a paging receiver 304 which has a receiving antenna 306 coupled to the paging receiver 304 by a cable 308. The output of paging receiver 304 is supplied at an output 310 along path 312 to an input 314 of a processor 316 which receives and processes the location information for output or display. In the illustrative example of FIG. 8, the information is stored along a path 318 in a register 320 from which the information can be retrieved along path 322 by the processor 316 for output at terminal 324 along path 326 to the input 328 of a data display 330. In this simple example illustrated by the block diagram of FIG. 8, the location information is processed for display as data which may be in the form of degrees of longitude and latitude, the names of the closest major street intersections or in terms of polar coordinates such as an azimuth heading and a distance between the base station 302 and the object locator 42. In alternative embodiments, the location information may be translated or converted during the processing operation into voice signals for output as a spoken message via an audio output device (not shown in FIG. 8) or translated or converted into a form for plotting on a map using such means as at least alpha-numeric characters. In other alternative embodiments, the location information may be forwarded from the base station 18 to another remote device or station.

Figure 9:
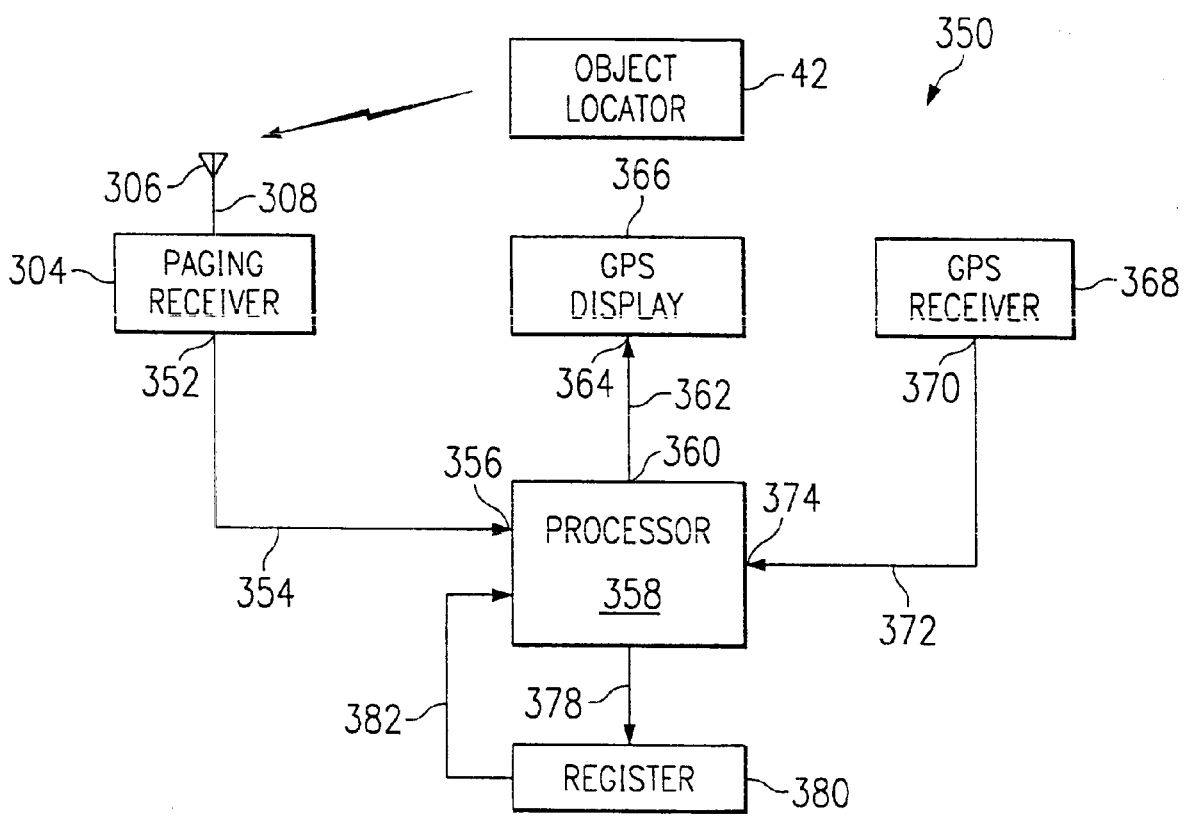
FIG. 9 illustrates a block diagram of an alternate embodiment of a base station that may be used with the object locator of the present disclosure.

Referring now to FIG. 9, there is illustrated an alternate embodiment showing a base station 350 which includes a paging receiver 304. Paging receiver 304 receives location information transmitted by object locator 42 to the antenna 306 of the paging receiver 304 along cable 308. Paging receiver 304 is coupled from an output 352 along path 354 to an input 356 of processor 358 in the base station 350. Processor 358 may also have access to a register 380 along path 378 from which the processor 358 may further obtain stored location information along path 382 from register 380. Such location information is, of course, available from the GPS receiver 368 via antenna 382 and cable 384 which information is coupled at an output 370 along path 372 to an input 374 to processor 358. This GPS receiver 368 is part of base station 350 and enables the base station 350 to provide an enhanced display of the location information obtained from the object locator 42.

Continuing with FIG. 9, there is shown a GPS display 366 that obtains data concerning the location coordinates from processor 358 at an output 360 which flows along path 362 to an input to the GPS display 366 at input 364. The GPS display 366 is configured to provide a map of the area that includes both the base station 350 and the object locator 42, and thus display the relative position of each component of the object locator system 10 with respect to the other. As is typical with GPS display units, a map may be shown with streets or thoroughfares indicated thereon and indicia included in the display showing the respective location of the base station 350 and of the object locator 42.

The embodiments described in FIGS. 8 and 9 are intended to be illustrative and not limited to the specific embodiments described for the purpose of illustrating the concepts and principles of the present disclosure. Output of location information in the form of alpha-numeric text, spoken messages or map displays may be implemented in any of several configurations that may be contemplated. Moreover, provision may be included to enable the user to select which output means is desired. Further, certain outputs of location information may be indicated by or accompanied by an alarm instead of or in addition to the selected output. Further, when the output is, for example, in a text format or a spoken format, the information provided may be used to manually plot the location coordinates on a geographic map of the area in which the object locator 42 is being used. In yet another embodiment of the present disclosure, the processing of coordinate data produced by the GPS receiver may include translation or conversion of the coordinate data into human readable form by the controller 66 (see FIG. 4) in the object locator 42 prior to the transmission of the location information to the paging system 12 or the base station 18 (see FIG. 1). In yet another embodiment of the present disclosure, the location information may be forwarded from the base station 18 to another remote device or station.

Figure 10:
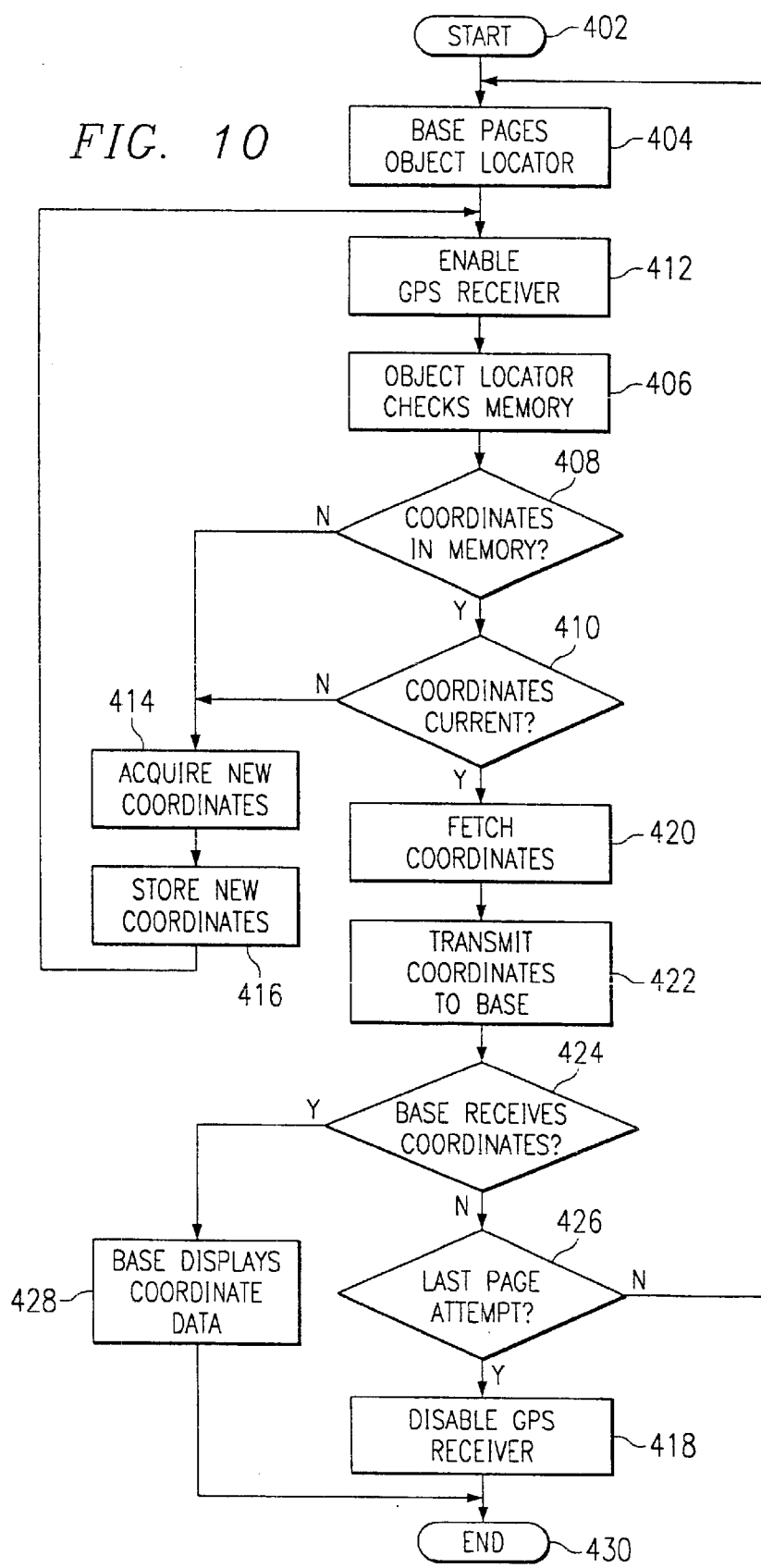
FIG. 10 illustrates a flowchart of the operation of the object locator system of the present disclosure in obtaining location data via two-way paging.

Referring now to FIG. 10, there is shown a flowchart of the operation of the combined units of the object locator system 10 of the present disclosure as illustrated in FIG. 1. The flow begins at block 402 where the routine starts and thereupon flows to a block 404 in which the base station 18 requests location information by paging the object locator 42. In this block 404, the base station 18 transmits a request for location information to the object locator 42. The flow proceeds from block 404 to block 412 where the object locator 42 proceeds through the sequence to enable the GPS receiver 78 in order to obtain new location coordinate information. Thereupon the flow proceeds to a block 406 wherein the object locator 42 checks its own memory—see, for example, the block diagram of the object locator 42 shown in FIG. 4—whereupon the flow proceeds to block 408 where the object locator 42 determines whether, in fact, there are coordinates in its memory. If the result is in the affirmative, then the flow proceeds along the "Y" path to a block 410 where a determination is made by the object locator 42 whether the coordinates stored in its memory are current. If the result in block 410 is affirmative, then the flow proceeds along the "Y" path to a block 420 where the object locator 42 will fetch the coordinate information from its memory 68 shown in FIG. 4 and set up the object locator 42 to transmit the coordinates to the base station in a block 422. Thereupon the flow proceeds to a block 424 wherein the base station 18 makes a determination as to whether it has received the requested coordinate information from the object locator 42. If the result is affirmative, then the flow proceeds along the "Y" path to a block 428 where the base station 18 proceeds to output or display the coordinate information to the user at the base station 18. Thereupon, the flow proceeds from block 428 to a block 430 wherein the routine ends.

Returning to block 424 of FIG. 10, if the base station 18 determines that it did not receive the coordinate information as requested, then the flow proceeds to block 426 along the "N" path to a decision block 426. In block 426, the base station 18 determines whether the most recent page of the object locator 42 was, in fact, the last attempt permitted within the protocol for the base station operation. If the result is affirmative, then the flow proceeds along the "Y" path to block 418 where the object locator 42 operates to disable the GPS receiver 78 so that it no longer uses power from the battery 70 of the object locator 42 and thereafter proceeds to block 430 where the routine ends. If, however, the result of the determination in block 426 was negative, then the flow returns to the start of the routine at the input to block 404 where the base station 18 re-attempts to page the object locator 42.

Returning now to block 408 in FIG. 10, the object locator 42 checks to determine whether location coordinate information is, in fact, in the memory 68 of the object locator 42. If the result is negative, the flow proceeds along the "N" path to block 414 where the object locator 42 acquires the new coordinate information and, as previously described, proceeds in block 416 to store the new coordinate information in memory 68 of the object locator 42. The flow then returns to the input of block 412 wherein the GPS receiver 78 is enabled.

The above noted object location system was disclosed as being utilized in conjunction with a pet, such that the pet owner can determine the location of their wayward pet. The locator, as described hereinabove, in one embodiment, is triggered to determine the location of the pet in response to receiving a signal from a paging system. The paging system utilizes existing infrastructure in order to direct a message over a wireless link to a moving object, such as the pet. This only requires the inclusion of a paging receiver tuned to the frequency of the paging transmitters. Of course, there are multiple paging transmitters disposed about any given area. If the pet wandered outside of the range of all of these paging transmitters, then the system will not work. This would then, in the alternative, require a direct RF link to the pet.

Once the object locator 42 has received the request, the locator 42 will do one of two things. First, it could merely search its own memory to determine if location coordinates are stored therein from a previous acquisition operation of the GPS system. If so, these could be transmitted back to the requester. Alternatively the GPS system is turned on in response to receiving the request and then the location determined. Of course, as described hereinabove, there are provisions made for situations wherein the GPS system cannot be acquired.

When the information is to be transmitted back to the user, the disclosed embodiment sets forth the use of a two-way pager. These two-way pagers are desirable in that they make use of the existing infrastructure of the paging system. This is facilitated by the inclusion of a plurality of receivers at each of the paging towers or paging "sticks" which allow the signal to be received and forwarded back to a central station. This central station then processes the information received and forwards it to the user. This information, as described hereinabove, is in the form of coordinates. This coordinate information can then be relayed back to the user in any number of ways. It could actually be forwarded via a paging channel to the user, which might result in a latency of approximately two to five minutes. Alternatively, it could be transmitted directly to the user, providing there was such an infrastructure. This infrastructure could even incorporate the use of a cellular telephone system. In any event, it is necessary to have the coordinates relayed back to the user in order to determine the relative location of the user and the wayward pet. The two-way system that can be utilized is a conventional system, one example of such a conventional system described in U.S. Pat. No. 5,708,971, issued Jan. 13, 1998, and entitled "TWO-WAY PAGING SYSTEM AND APPARATUS," which is incorporated herein by reference.

Figure 11:
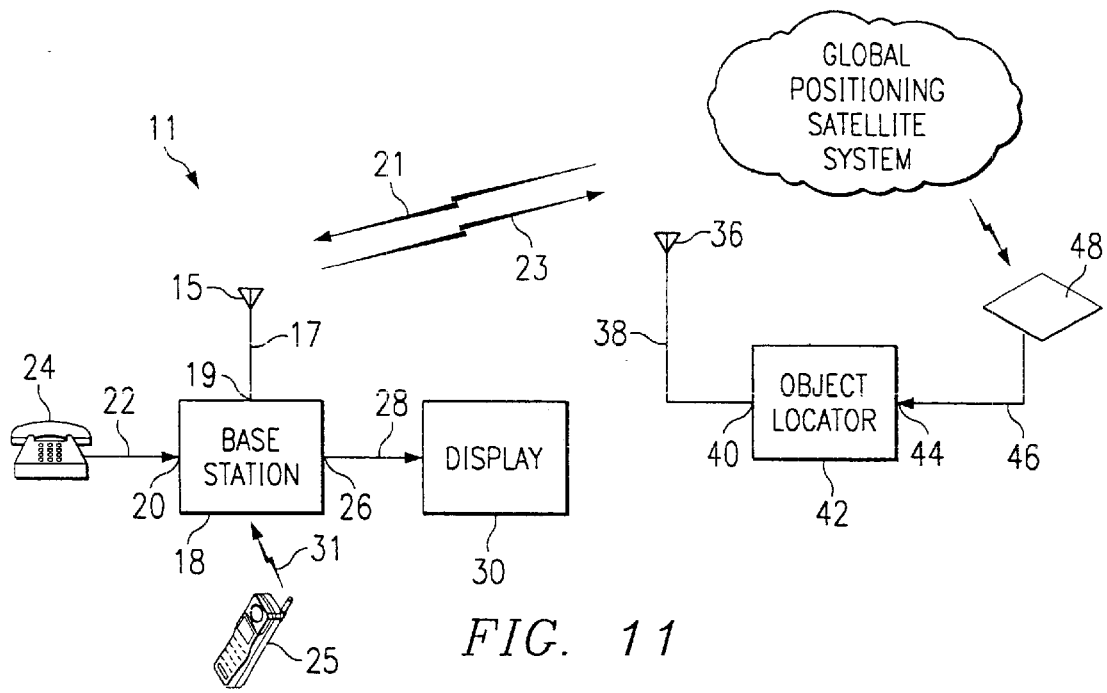
FIG. 11 illustrates a block diagram of an alternative embodiment of an object locator system of the present disclosure.

Referring now to FIG. 11, there is illustrated a system block diagram of an alternate embodiment of an object locator system of the present disclosure. In FIG. 11, the object locator system 11 includes a base station 18, an object locator 42 and a global positioning satellite system 50. The base station 18 and the object locator 42 communicate directly with each other over a wireless link shown by the pair of arrows, arrow 21 and arrow 23. This wireless link 21, 23 will be described further hereinbelow. The base station 18 may include a telephone, pager and the like or may have an input 20 for receiving a dialed-in telephone number from a telephone set 24 along communications path 22 or from a wireless telephone set 25 over communications path 31. In general, the input 20 is responsive to dual-tone multi-frequency (DTMF) tones transmitted by telephone set 24 or wireless telephone set 25. Base station 18 further has an output 26 from which location data to be displayed travels along path 28 to display 30. Display 30 may be configured to display location information in any of several forms, for example, text, figures, graphics, or numbers. In a typical graphics display, a map of the region in which the object locator 42 is operating may be displayed with the location coordinates for the object locator displayed on the map reproduced on display 30. The wireless link 21, 23 may be any radio frequency communications channel operable between two stations such as a direct RF link in a system having a base station and a mobile station and not requiring an intermediate station to relay transmissions between the base and mobile stations. Or, in the alternative, the wireless link 21, 23 may utilize satellite communications to link together the object locator 42 and the base station 18 shown in FIG. 11. In such a system, the antenna 15 and 36 and their associated transmit and receive structures are, of course, configured for satellite communications which will then occur as represented by wireless link 21, 23. Thus, the wireless links 21,23 may be implemented by numerous alternative means that are well known in the art and will not be described further. One example, shown in the illustrative embodiment of FIG. 1 utilizes a two-way paging system to provide the RF or wireless link between the base station 18 and the object locator 42.

Continuing with FIG. 11, the object locator system 11 of the present disclosure includes an object locator 42. The object locator 42 includes an input 40 coupled to an antenna 36 along cable 38 for receiving signals transmitted in the wireless link from the base station 18. The object locator 42 also includes an input 44 for receiving location information signals from a global positioning satellite (GPS) system 50 via the RF path 52 and intercepted by antenna 48. From antenna 48, the GPS signals are conducted to the object locator 42 along path 46 to input 44. The GPS system 50 is of a conventional design well known in the art, illustratively described in U.S. Pat. No. 5,726,660 issued Mar. 10, 1998 to Purdy, et al. and entitled PERSONAL DATA COLLECTION AND RECORDING SYSTEM, which patent is hereby incorporated by reference herein in its entirety. Alternatively, location information signals may be received from the GLONASS Satellite System by the use of a receiving system configured for such reception.

In operation, object locator 42 is intended to be carried or attached to an individual, an object or an animal to be located or tracked by the object locator system 11 of the present disclosure. A user enters the system from the base station, for example, 18 by dialing the telephone number address corresponding to the object locator 42. The object locator 42 functions as a receiver for receiving requests or instructions along wireless link 23 or as a transmitter of location information along wireless link 21 to the base station 18. As described hereinabove, the telephone number may be dialed on telephone set 24 or telephone set 25. The DTMF signal generated by the telephone set 24 or 25 is coupled by path 22 to input 20 of base station 18. At the base station 18 the DTMF request signal is converted to a wireless signal and transmitted from antenna 15 along transmit path 23 to the antenna 36 coupled to object locator 42 along cable 38. The object locator 42 processes the request for location information transmitted by base station 18, obtains location information from the global positioning satellite system 50 and transmits a response containing the location information from antenna 36 along path 21 to the antenna 15 coupled to base station 18 for processing and display on display 30. Alternatively, in some applications, specific structural components of a standard telephone channel, adapted for the purpose, may be substituted for the wireless paths 21 and 23, along with antenna 15 and antenna 36 and their related structures.

Figure 12A:
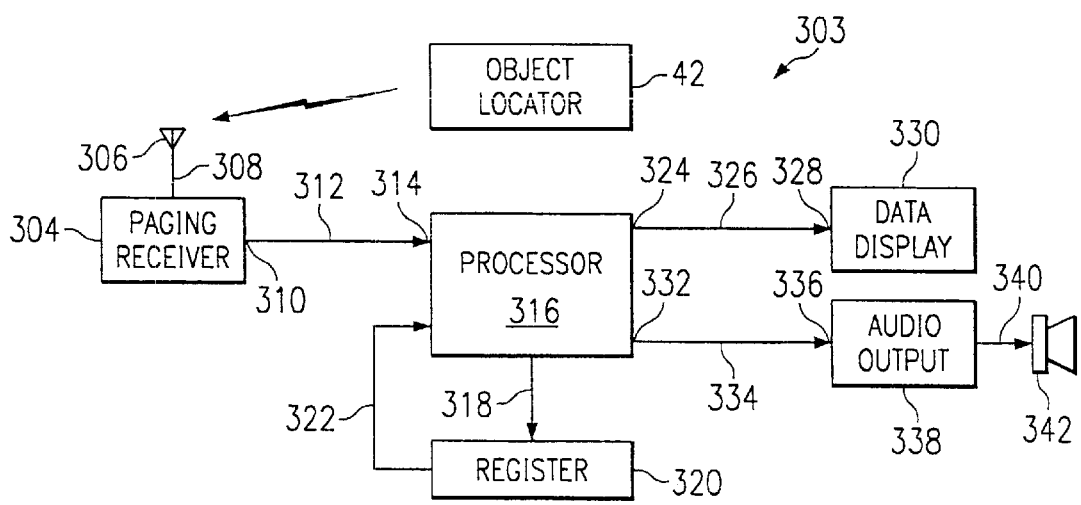
FIG. 12a illustrates a block diagram of an alternative embodiment of a base station according to the present disclosure.

Referring now to FIG. 12a, there is illustrated a block diagram of an alternative embodiment of a base station 303 including features which may be implemented in the base station 302 of FIG. 8 described hereinabove to process the location information received from the object locator 42. In the embodiment shown in FIG. 12a, the base station 302 includes a paging receiver 304 which has a receiving antenna 306 coupled to the paging receiver 304 by a cable 308. The output of paging receiver 304 is supplied in an output 310 along path 312 to an input 314 of a processor 316 which receives and processes the location information for output or display. In the illustrative example of FIG. 12a, the information is stored via path 318 in a register 320. From register 320, the information may be retrieved via path 322 by the processor 316 for processing prior to being output at terminal 324 along path 326 to the input 328 of a data display 330. In this simple example illustrated by the block diagram of FIG. 12a, the location information is processed for display as data which may be in the from of degrees of longitude and latitude, the names of the closest major street intersections, as indicia of the object locator 42 and the base station 18 or in terms of polar coordinates such as an asimuth heading and a distance between the base station 302 and the object locator 42.

In other embodiments corresponding to FIG. 12a, the location information may be translated or converted into a form for plotting on a map reproduced on display 330.

In still other alternative embodiments, the location information may be translated or converted during the processing operation into voice signals for output as a spoken message via an audio output 338 shown in FIG. 12a. The audio output 338 receives location information translated or converted into voice signals from output 332 along line 334 to input 336 of audio output 338. Audio output 338 may typically be an audio power amplifier for generating an audio signal with sufficient power to drive a loudspeaker, for example. In other embodiments, such audio output 338 may be configured as a line output to drive a voice mail system, a telephone connection or other audio output means. From the audio output 338, in this illustrative example, the voice or audio signal is coupled along line 340 to loud speaker 342 for playback to the user. In addition to voice signals, certain annunciating signals indicative of an alarm condition as described hereinabove may also be coupled along line 334 to audio output 338 for playback by loudspeaker 342 or by an alarm transducer configured for the purpose.

Figure 12B:
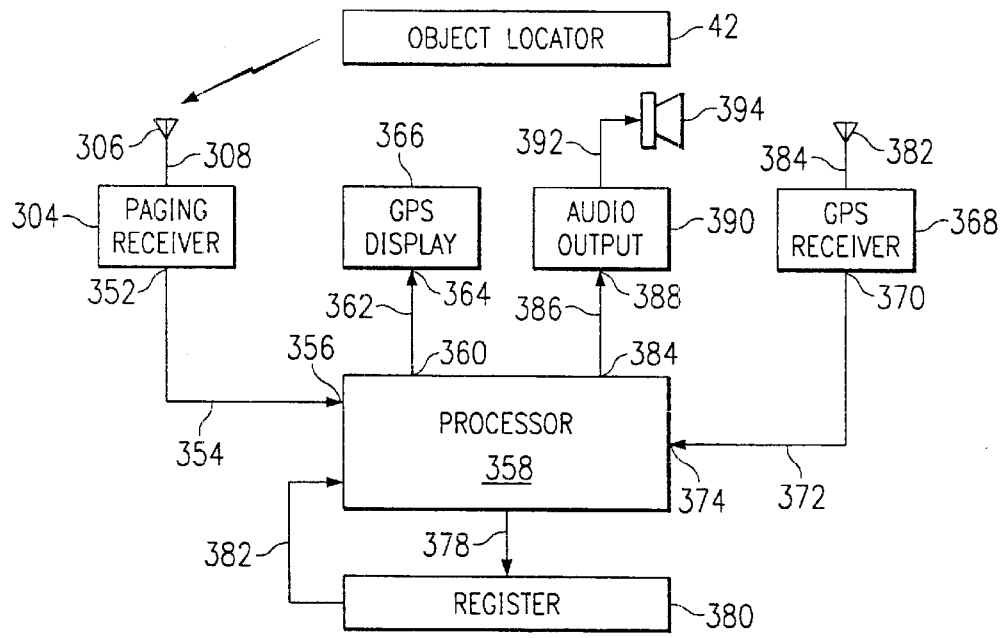
FIG. 12b illustrates a block diagram of another alternative embodiment of a base station according to the present disclosure.

Referring now to FIG. 12b, there is illustrated another alternate embodiment of a base station 351. The base station 351 includes a paging receiver 304. Paging receiver 304 receives location information transmitted by object locator 42 to the antenna 306 of the paging receiver 304 along cable 308. The output of paging receiver 304 is coupled from an output 352 along path 354 to an input 356 of processor 358 in the base station 351. Processor 358 may also have access to a register 380 along path 378 from which the processor 358 may further obtain stored location information along path 382 from register 380. Such location information is, of course, available from the GPS receiver 368 via antenna 396 coupled to GPS receiver 368 along cable 398. The location information then, is coupled at an output 370 from GPS receiver 368 along path 372 to an input 374 to processor 358. This GPS receiver 368 is part of base station 351 and enables the base station 351 to provide an enhanced display of the location information obtained from the object locator 42. This enhanced display, for example, may include the presentation of a map of the region in which the object locator 42 is to be operated.

Continuing with FIG. 12b, there is shown GPS display 366, which is the enhanced display referred to in the preceding paragraph, that obtains data concerning the location coordinates from processor 358 at an output 360 which flows along path 362 to an input to the GPS display 366 at input 364. The GPS display 366 is configured to provide a map of the area that includes both the base station 351 and the object locator 42, and thus may display the relative position of each component of the object locator system 10 with respect to the other. Shown further in FIG. 12b is audio output 390 which is operable to receive voice signals or other audio frequency signals at input 388 via line 386 from output 384 of processor 358, such signals resulting from translation or conversion of the location information during the processing operation in processor 358. Audio output 390 prepares the audio signals for driving loudspeaker 394 via line 392. In addition to voice signals, certain annunciating signals indicative of an alarm condition may also be coupled along line 386 to audio output 390 for playback by loudspeaker 394. Audio output 390 may typically be an audio power amplifier for generating an audio signal with sufficient power to drive a loudspeaker as described hereinabove. In other embodiments such audio output may be configured as a line output to drive a voice mail system, a telephone connection or other audio means.

It will be appreciated that FIGS. 12a and 12b may also implement the object locator system 11 of FIG. 11 merely by substituting some other wireless link for the paging system and paging receiver 304 shown in FIGS. 12a and 12b. As is typical with GPS display units, a map may be shown with streets and thoroughfares indicated thereon and indicia included in a display showing the respective location of the base station 350 and of the object locator 42. Moreover, as described hereinabove, readout statements providing street names, longitude, latitude, azimuth or distance may also be included in the displayed output.

The embodiments described in FIGS. 12a and 12b are intended to be illustrative and not limited to the specific embodiments illustrating the concepts and principles of the present disclosure. Output of location information in the form of alpha-numeric text, spoken messages or map displays may be implemented in any of the several configurations that may be contemplated. Moreover, provision for including several different output structures as illustrated in FIGS. 12a and 12b and for enabling the user to select which output means is desired may also be incorporated in the systems illustrated hereinabove. Certain outputs of location information may be indicated by or accompanied by an alarm instead of or in addition to the selected output. Moreover, when the output is, for example, in a text format or a spoken format, the information provided may be used to manually plot the location coordinates on a geographic map of the area in which the object locator 42 is being used. In yet another embodiment of the present disclosure, the processing of coordinate data produced by the GPS receiver may include translation or conversion of the coordinate data into human readable form by the controller 66 (see FIG. 4) in the object locator 42 prior to the transmission of the location information from the object locator 42 to the base station 18 (see FIG. 1).

Figure 13:
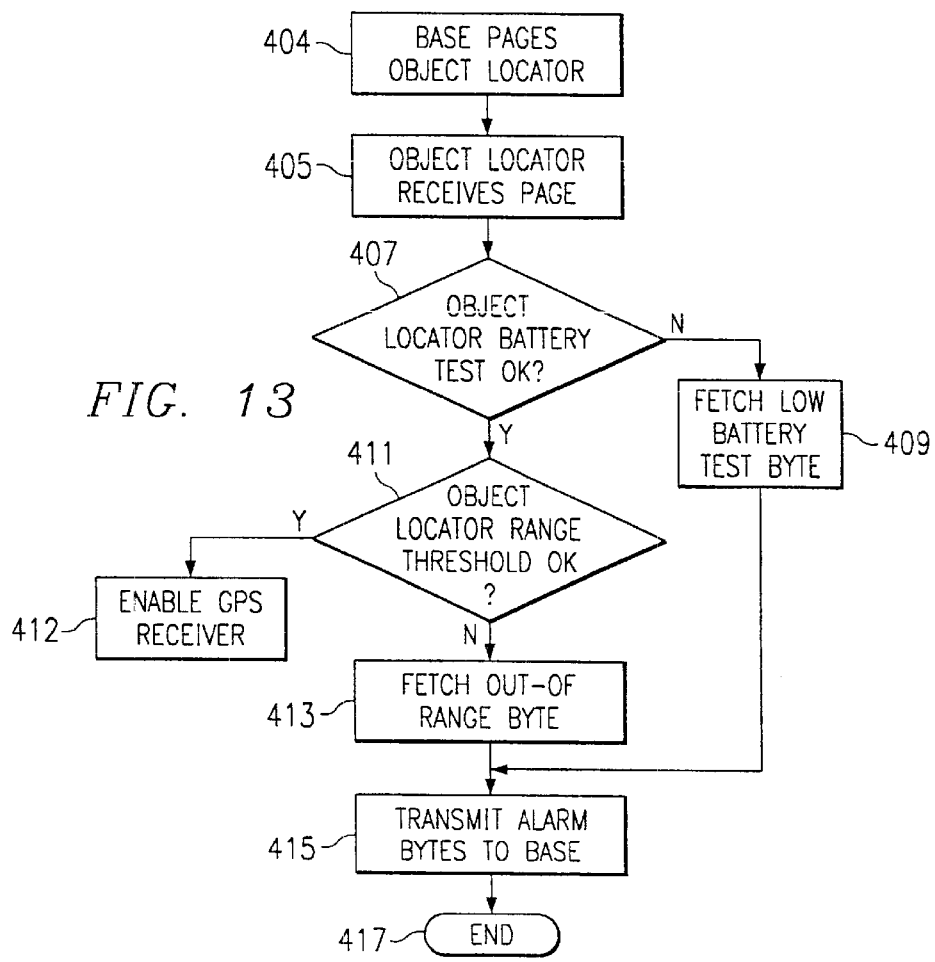
FIG. 13 illustrates an expanded portion of the flowchart of FIG. 10 showing an alternative embodiment of the operation of the object locator system of the present disclosure.

Referring now to FIG. 13, there is shown an expanded portion of a flowchart of the operation of an alternate embodiment to the object locator system illustrated in the flowchart of FIG. 10 and the block diagram of FIG. 4.

FIG. 13 illustrates just two cases where the object locator 42 is operable to associate other information related to the operation of the object locator system 10 with the location coordinate information in order to enhance the functionality of the object locator system 10. The examples in FIG. 13 illustrate associating information about battery condition or relation of the object locator to a boundary or a threshold with the location coordinate information that can be transmitted from the object locator 42 to the base station 18. It will be observed by inspection of FIG. 13 that the flow begins at block 404 and continued through block 412 which blocks respectively also appear in FIG. 10 as consecutive blocks in the flowchart following the start block at 402.

Continuing now with FIG. 13, beginning with block 404 where the base station 18 of FIG. 1 (or the base stations of FIGS. 8, 9, 12a and 12b) pages the object locator 42 and the flow thereupon proceeds to block 405 wherein the object locator 42 receives the page from base station 18. Upon the receipt of a page from the base station 18, the object locator in decision block 407 then performs a test of the battery 70 to determine whether or not there is sufficient battery capacity to proceed with the acquisition of location coordinate information from the GPS system 50. If the battery test indicates that sufficient battery capacity exists, then the flow proceeds along the "Y" path to decision block 411 where the object locator 42 performs a second test to determine whether or not a threshold has been traversed. For example, the object locator 42 may be within or beyond a predetermined range established by the strength of a signal being transmitted from the base station 18 or by the receipt of a signal indicating traversal of the boundary of an electronic fence. In the event that the determination made in decision block 411 is affirmative, then the flow proceeds along the "Y" path to block 412 to enable the GPS receiver 78 in the object locator 42. Thereupon the flow proceeds to the steps of the flowchart as illustrated in FIG. 10.

Continuing with FIG. 13, if, however, the battery test performed in decision block 407 in FIG. 13 was negative indicating that the battery 70 has insufficient capacity to perform the complete acquisition of location coordinate information from the GPS system 50, then the flow proceeds along the "N" path to block 409 where the controller 66 (see FIG. 4) in the object locator 42 will proceed to fetch the alarm byte for a low battery to indicate that the battery 70 has insufficient capacity. This low-battery test alarm byte is provided to the transmitter in the object locator 42 and, as shown in block 415, the object locator 42 is operable to transmit this alarm byte to the base station 18. Following the transmission of the alarm byte indicating a low battery test, the flow proceeds from block 415 to block 417 where the routine ends. Returning now to block 411 where the object locator 42 performed a threshold test, if the determination in that test of decision block 411 is in the negative, then the flow proceeds along the "N" path to block 413 where the controller 66 in the object locator 42 fetches the out-of-range alarm byte and sends it to the transmitter to be transmitted in block 415 as an alarm byte to the base station 18. Thereupon the flow proceeds as before to block 417 and the routine ends.

Although the preferred embodiment has been described in detail, it should be understood that various changes, substitutions and alterations can be made therein without departing from the spirit and scope of the invention as defined by the appended claims.

What is claimed is:

1. A mobile communication unit (MCU) for locating or tracking an animate object and operable in a system including a wireless communication network and a base station, comprising:

satellite receiving means for receiving data transmissions from a satellite navigation system responsive to an activation signal provided at select intervals in time;

transmitting means for transmitting processed location data via said wireless communication network to a user at said base station; and controlling means operatively coupled to said satellite receiving means and said transmitting means for providing said activation signal to control said satellite receiving means, processing said data transmissions received from said satellite navigation system and for coupling said processed location data to said transmitting means for communication of said processed location data from said transmitting means to said user at said base station wherein said mobile communication unit is configured for carrying by said animate object.

2. The mobile communication unit of claim 1, wherein said satellite receiving means comprises:

a global positioning system (GPS) receiver; and a receiving antenna coupled to said GPS receiver and operable to receive said data transmissions.

3. The mobile communication unit of claim 1, wherein said select interval comprise at least one time period determined in said controlling means.

4. The mobile communication unit of claim 1, wherein said select interval corresponds to a predetermined period of immobility of said animate object.

5. The mobile communication unit of claim 4, wherein said predetermined period of immobility triggers an alarm indicator.

6. The mobile communication unit of claim 1 wherein said select intervals comprise a succession of time periods determined in said controlling means.

7. The mobile communication unit of claim 6, wherein said time periods comprise equal valued time periods determined in said controlling means.

8. The mobile communication unit of claim 1, wherein said transmitting means comprises a paging transmitter operable to communicate on a paging network.

9. The mobile communication unit of claim 1, wherein said transmitting means comprises a paging transmitter operable to communicate on a paging network wherein said paging network is operable to translate said processed location data into human readable form.

10. The mobile communication unit of claim 1, wherein said transmitting means comprises a wireless transmitter operable to communicate on a wireless network wherein said wireless network is operable to translate said processed location data into human readable form.

11. The mobile communication link of claim 1, wherein said transmitting means is operable to communicate with said base station via a direct radio frequency link.

12. The mobile communication unit of claim 1, wherein said processed location data comprises coordinate information for said mobile communication unit in association with a time value.

13. The mobile communication unit of claim 12, wherein said processed location data comprises coordinate information for said mobile communication unit in association with an alarm indicator.

14. The mobile communication unit of claim 1, wherein said base station comprises:
    receiving means for receiving said processed location data via said wireless communication network; and
    readout means for providing access to said processed location data.

15. The mobile communication unit of claim 14, wherein said base station comprises translation means operable to translate said processed location data into human readable form.

16. The mobile communication unit of claim 1, wherein said controlling means comprises:
    a processing device operable according to a stored program; and
    a memory operable for storing said stored program and data operated on by said processing device.

17. The mobile communication unit of claim 16, wherein said activation signal is determined according to said stored program in said processing device.

18. The mobile communication unit of claim 1, wherein said processed location data communicated to said user at said base station includes street name information.

19. A method for providing information about a location of an animate object to a user at a base station, wherein a mobile control device carried by the animate object and coupled with a satellite navigation receiver and a transmitter in communication via a wireless communication network with the base station is operable to obtain location information from the satellite navigation receiver according to the steps of:
    activating the satellite navigation receiver responsive to an activation signal generated in the mobile control device at a predetermined time to acquire the location information from satellite transmissions of a satellite navigation system;
    processing the location information output from the satellite navigation receiver to said control device for coupling processed location information to the transmitter; and
    transmitting the processed location information from the transmitter to the base station via the wireless communication network to communicate the information about the location of the animate object carrying the control device.

20. The method of claim 19, wherein the step of activating comprises the step of providing the activation signal at select intervals in time.

21. The method of claim 20, wherein said select intervals comprise at least one time period determined in the mobile control device.

22. The method of claim 20, wherein said select intervals comprise a succession of time periods determined in the mobile control device.

23. The method of claim 22, wherein the time periods comprise equal valued time periods determined in the mobile control device.

24. The method of claim 19, wherein the activation signal is determined according to a stored program operable in the mobile control device.

25. The method of claim 19, wherein the step of activating comprises the steps of:
    activating the satellite navigation receiver in accordance with a stored program operable in the mobile control device;
    acquiring location information from satellite transmissions of the satellite navigation system; and
    coupling location information output by the satellite navigation receiver to the mobile control device.

26. The method of claim 25, wherein the step of activating is performed at periodic intervals in accordance with the stored program.

27. The method of claim 19, wherein the step of processing comprises the steps of:
    inputting the location information for storage in a memory associated with the mobile control device;
    processing the location information to express the location information relative to a predetermined local origin; and
    retrieving the location coordinates from the memory for coupling to an input of the transmitter.

28. The method of claim 19, further comprising the step of converting the information about the location of the animate object to at least one street name.

29. A mobile communication unit (MCU) for locating or tracking an animate object, comprising:
    a satellite navigation system receiver having a receiver enable input and an output, said receiver coupled to a first antenna for receiving transmissions from a satellite navigation system upon activation at select intervals in time to provide location data from said output;
    a transmitter having a transmit enable input and a data input, said transmitter coupled to a second antenna for communication to a base station when said location data is provided at said data input;
    a controller for generating activation signals at select intervals in time to activate said satellite navigation system receiver and for processing said location data and controlling communication of proposed location data to said base station at select intervals, said controller having a location data input responsive to said output of said satellite navigation system receiver, a transmit data output for providing said processed location data to said data input of said transmitter, a receiver enable output for coupling a receiver enable signal to said receiver enable input of said receiver and a transmit enable output for coupling a transmit signal to said transmit enable input of said transmitter; and a carrier for supporting said MCU upon said animate object.

30. The mobile communication unit of claim 29, wherein said select interval comprises at least one time period determined in said controller.

31. The mobile communication unit of claim 29, wherein said select interval corresponds to a predetermined period of immobility of said animate object.

32. The mobile communication unit of claim 31, wherein said predetermined period of immobility triggers an alarm indicator.

33. The mobile communication unit of claim 29, wherein said base station comprises translation means operable to translate said processed location data into human readable form.

34. The mobile communication unit of claim 29, wherein said controlling means comprises:

a processing device operable according to a stored program; and a memory operable for storing said stored program and data operated on by said processing device.

35. The mobile communication unit of claim 33, wherein said activation signal is determined according to said stored program in said processing device.

36. A mobile communication unit (MCU) for locating or tracking an animate object and operable in a system including a wireless communication network and a base station, comprising:

satellite receiving means for receiving data transmissions from a satellite navigation system responsive to an activation signal provided at select intervals in time;

transmitting means for transmitting processed location data via said wireless communication network to a user at said base station;

controlling means operatively coupled to said satellite receiving means and said transmitting means for providing said activation signal to control said satellite receiving means, processing said data transmissions received from said satellite navigation system and for coupling said processed location data to said transmitting means for communication of said processed location data from said transmitting means to said user at said base station; and secondary receiving means in said mobile communication unit for receiving transmissions from said base station via said wireless communication network wherein said mobile communication unit is configured for carrying by said animate object.

37. The mobile communication unit of claim 36, wherein said satellite receiving means comprises:

a global positioning system (GPS) receiver; and a receiving antenna coupled to said GPS receiver and operable to receive said data transmissions.

38. The mobile communication unit of claim 36, wherein said transmitting means comprises:

a first antenna; and a paging transmitter coupled to said first antenna and operable to communicate via a paging network.

39. The mobile communication unit of claim 36, wherein said controlling means comprises:

a processing device operable according to a stored program; and a memory operable for storing said stored program and data operated on by said processing device.

40. The mobile communication unit of claim 39, wherein said activation signal is determined according to said stored program in said processing device.

41. The mobile communication unit of claim 36, wherein said secondary receiving means comprises:

a second antenna; and a receiver coupled to said second antenna and operable to communicate via said wireless communication network.

42. The mobile communication unit of claim 36, wherein said transmissions from said base station comprise information.

43. The mobile communication unit of claim 42, wherein said information comprises information adapted to configure said mobile communication unit for operation.

44. The mobile communication unit of claim 36, wherein said MCU is operable in a system including a wireless paging network and a base station.

45. The mobile communication unit of claim 44, wherein said transmissions from said base station comprise information.

46. The mobile communication unit of claim 45, wherein said information comprises information adapted to configure said mobile communication unit for operation.

* * * * *